US010009874B2

(12) United States Patent
Aki et al.

(10) Patent No.: US 10,009,874 B2
(45) Date of Patent: Jun. 26, 2018

(54) INDUSTRIAL WIRELESS COMMUNICATIONS SYSTEM

(71) Applicant: SMC CORPORATION, Chiyoda-ku (JP)

(72) Inventors: Tomohiko Aki, Nagareyama (JP); Kazuhiro Ishikawa, Kita-ku (JP); Koji Kunii, Kitakatsushika-gun (JP); Toshiaki Kuwahara, Tsukubamirai (JP); Yoshihiro Nozaki, Higashimurayama (JP); Shengcong Wu, Nagareyama (JP); Norimasa Ozaki, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days. days.

(21) Appl. No.: 15/469,743

(22) Filed: Mar. 27, 2017

(65) Prior Publication Data
US 2017/0289959 A1 Oct. 5, 2017

(30) Foreign Application Priority Data

Apr. 4, 2016 (JP) .................................. 2016-075489
Dec. 26, 2016 (JP) .................................. 2016-250469

(51) Int. Cl.
*H04W 72/00* (2009.01)
*H04B 1/713* (2011.01)
(Continued)

(52) U.S. Cl.
CPC .......... *H04W 72/005* (2013.01); *H04B 1/713* (2013.01); *H04W 56/0015* (2013.01);
(Continued)

(58) Field of Classification Search
CPC .......... H04W 72/005; H04W 56/0015; H04W 72/0453; H04W 72/0446; H04W 84/18; H04B 1/713
See application file for complete search history.

(56) References Cited

U.S. PATENT DOCUMENTS 5,604,386 A 2/1997 Nagai et al.
2007/0229302 A1 10/2007 Penick et al.
(Continued)

FOREIGN PATENT DOCUMENTS

JP 5-73795 3/1993

OTHER PUBLICATIONS

Extended European Search Report dated May 22, 2017 in European Patent Application No. 17163281.3.

*Primary Examiner* — Vineeta Panwalkar
(74) *Attorney, Agent, or Firm* — Oblon, McClelland, Maier & Neustadt, L.L.P.

(57) ABSTRACT

An industrial wireless communications system includes a PLC that performs at least monitoring within an industrial facility, at least one master wireless device connected to the PLC by a fieldbus, a plurality of slave wireless devices, which are installed corresponding to respective hardware devices, and carry out wireless communications with the master wireless device, a connection processing unit that carries out a connection process wirelessly between the master wireless device and the slave wireless devices, and a transmission/reception processing unit that transmits and receives data wirelessly between the master wireless device and the slave wireless devices.

5 Claims, 13 Drawing Sheets

(51) Int. Cl.
 *H04W 72/04* (2009.01)
 *H04W 56/00* (2009.01)
 *H04W 84/18* (2009.01)

(52) U.S. Cl.
 CPC ... *H04W 72/0446* (2013.01); *H04W 72/0453* (2013.01); *H04W 84/18* (2013.01)

(56) References Cited

U.S. PATENT DOCUMENTS

2009/0168707 A1* 7/2009 Nakae .................... H04L 45/30
 370/329
2009/0204265 A1   8/2009 Hackett
2011/0320028 A1  12/2011 Penick et al.
2016/0087814 A1*  3/2016 Shimizu ............... H04L 12/403
 370/252

* cited by examiner

INDUSTRIAL WIRELESS COMMUNICATIONS SYSTEM

CROSS-REFERENCE TO RELATED APPLICATIONS

This application is based upon and claims the benefit of priority from Japanese Patent Applications No. 2016-075489 filed on Apr. 4, 2016 and No. 2016-250469 filed on Dec. 26, 2016, the contents all of which are incorporated herein by reference.

BACKGROUND OF THE INVENTION

Field of the Invention

The present invention relates to an industrial wireless communications system, and more particularly relates to an industrial wireless communications system which is capable of realizing wireless communications in a stabilized manner in an FA (Factory Automation) environment.

Description of the Related Art

Heretofore, as an industrial facility, the network system disclosed in Japanese Laid-Open Patent Publication No. 05-073795 is known. In this system, a plurality of sequencers are connected to the network system by a bus. An actuator and a drive source of a robot are connected electrically via a conductive member and a signal line to each of the respective sequencers. Furthermore, the drive sources are connected to the actuators and the robots via electrical wiring, respectively.

SUMMARY OF THE INVENTION

Incidentally, there has conventionally been a demand to reduce the amount of wiring in industrial facilities. For example, as shown in Japanese Laid-Open Patent Publication No. 05-073795, an upper level host controller and respective control devices are connected by a fieldbus in accordance with an industrial communications standard. In each of the control devices, a connection is required between a power supply line and a communications line. Consequently, in a large-scale facility or a distributed installation, it is necessary to connect the signal lines from the host controller, and the degree of freedom in relation to installation of the control devices is limited.

In addition, for making industrial facilities intelligent, it becomes necessary to lay down communications lines also in connection with a robot or a movable part such as a rotating mechanism. In this case, expensive slip rings must be used, or there is a risk of disconnection of the signal lines, and there has been no choice but to abandon the installation of such communications equipment, and to give up on making the industrial facilities themselves intelligent.

The present invention has been devised taking into consideration the aforementioned problems, and has the object of providing an industrial wireless communications system, in which the risk of disconnection of signal lines or the like in association with movable parts of various hardware devices that are installed in industrial facilities can be reduced, and which is capable of improving the freedom of design in such industrial facilities.

[1] An industrial wireless communications system according to the present invention is characterized by a computer configured to perform at least monitoring within an industrial facility, at least one master wireless device connected to the computer by a fieldbus, a plurality of slave wireless devices, which are installed corresponding to respective hardware devices, and are configured to carry out wireless communications with the master wireless device, a connection processing unit configured to carry out a connection process wirelessly between the master wireless device and the slave wireless devices, and a transmission/reception processing unit configured to transmit and receive data wirelessly between the master wireless device and the slave wireless devices.

In the present invention, connection processing and transmission and reception of signals are carried out wirelessly between the master wireless device, which is connected to a computer (for example, a PLC or the like), and slave wireless devices installed in various hardware devices (such as robots, welding guns, rotating jigs, motors, etc.). As a result, the risk of disconnection of the signal lines and the like in movable components of the hardware devices can be reduced, and it is possible to improve the freedom of design in industrial facilities. This also leads to the promotion of intelligent systems in such industrial facilities.

[2] In the present invention, the connection processing unit may perform wireless communications at time intervals of 500 msec or less from the master wireless device to the plurality of slave wireless devices over a broadcast system and at synchronous frequencies, and the transmission/reception processing unit may perform wireless communications by a frequency hopping method between the master wireless device and the slave wireless devices.

In accordance with this feature, from the fact that the connection process is carried out over the broadcast system and at time intervals of 500 msec or less, for example, at the time of attaching an assembly jig, it is possible to shorten the time from turning on the power source to the start of communications therewith. Further, from the fact that wireless communications are performed by a frequency hopping method between the master wireless device and the slave wireless devices, it is possible to prevent interference with other wireless communications.

[3] In the present invention, a 2.4 GHz band preferably is used as a wireless frequency, and a wireless power preferably is less than or equal to 1 mW.

Since a wireless frequency is adopted which is higher than the frequency of noise generated from a noise source (such as power supply lines, a robot, a welding gun, a rotating jig, a motor, etc.) of industrial equipment of a factory or the like, it is possible to reduce the influence on wireless communications by the noise frequency. Further, because the wireless power is suppressed to be less than or equal to 1 mW, it is possible to reduce interference with other communications equipment that exists within the same area.

[4] In the present invention, there may further be included a connection maintenance processing unit configured to carry out a connection maintenance process with the master wireless device, by transmitting clock information of the master wireless device periodically with respect to the slave wireless devices in which the connection process has been carried out.

In accordance with this feature, since clock information from the master wireless device is transmitted periodically to the slave wireless devices for which the connection process has been completed, the clock information coincides between the slave wireless devices and the master wireless device. As a result, the timing of data transmission and reception or the like can easily be synchronized.

[5] In the present invention, there may further be included a connection confirmation processing unit configured to confirm establishment of wireless communications between the master wireless device and the plurality of slave wireless devices, by repeating periodic transmissions from the slave wireless devices and reception by the master wireless device.

Owing to this feature, it is possible to easily determine which ones of the slave wireless devices are in a connected state, and which ones of the slave wireless devices are in a disconnected state, and connection processing or maintenance, etc., with respect to slave wireless devices that are determined to be in the disconnected state can be carried out at an early stage.

In accordance with the industrial wireless communications system according to the present invention, it is possible to reduce the risk of disconnection of signal lines or the like in association with movable parts of various hardware devices that are installed in industrial facilities, and the freedom of design in such industrial facilities can be enhanced.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Below, an embodiment of an industrial wireless communications system according to the present invention will be described with reference to FIGS. 1 through 13. In the present specification, the symbol "-" (to or through) which indicates a numerical range is used with the implication that the numerical values written before and after the tilde symbol are included therein as a lower limit value and an upper limit value of the numerical range.

Figure 1:
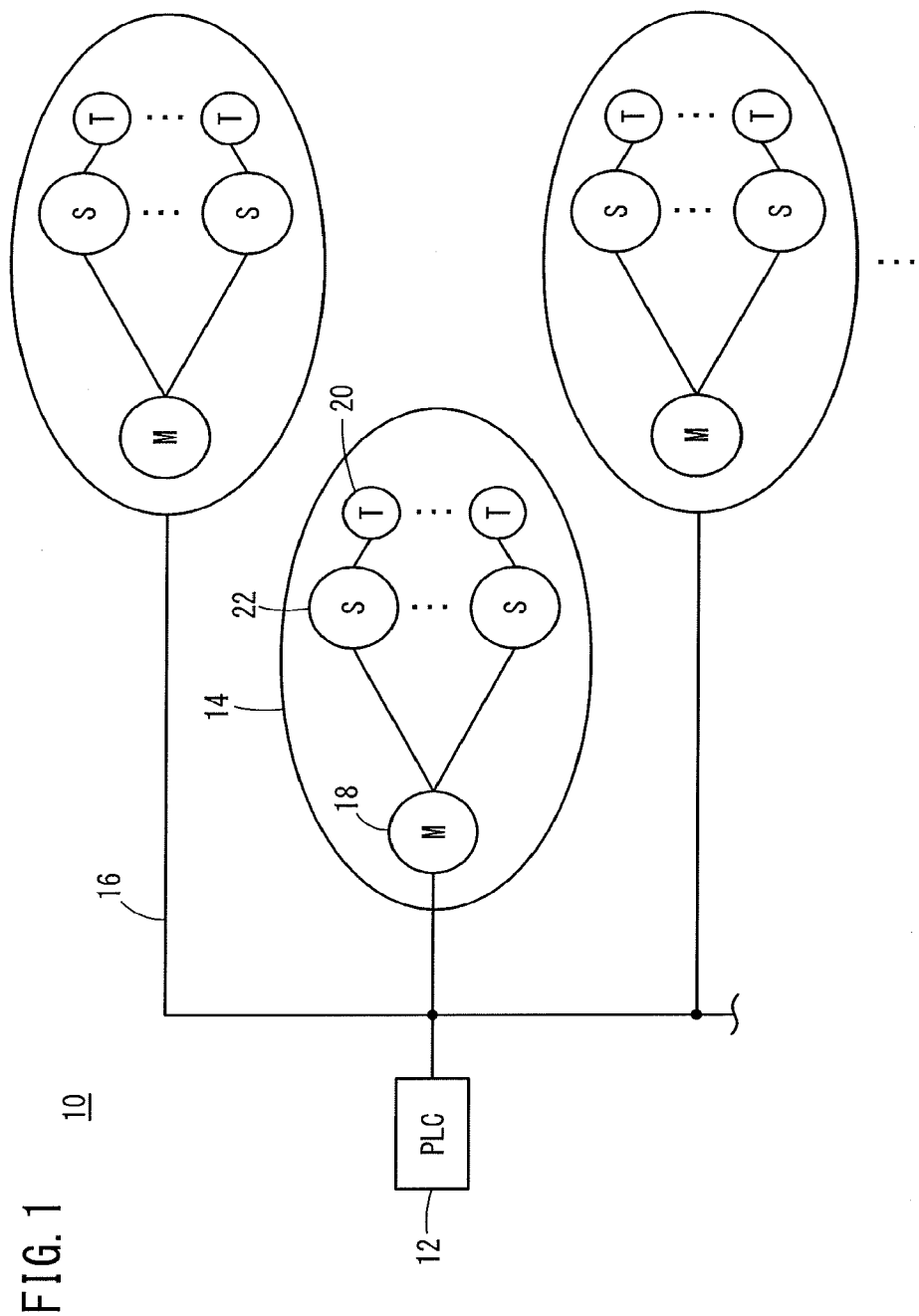
FIG. 1 is a configuration diagram showing an industrial wireless communications system according to the present embodiment.

As shown in FIG. 1, the industrial wireless communications system (hereinafter referred to as a wireless communications system 10) according to the present embodiment includes a PLC 12 (Programmable Logic Controller) that performs at least monitoring within an industrial facility, and a plurality of networks 14 which are connected to the PLC 12.

In each of the networks 14, there are included one master wireless device 18 connected to the PLC 12 by a fieldbus 16, and a plurality of slave wireless devices 22, which are installed corresponding to respective hardware devices 20, and carry out wireless communications with the master wireless device 18. As examples of such hardware devices 20 in which the slave wireless devices 22 are installed, there may be cited a distal end movable member (e.g., a welding gun or the like) of a robot hand, an assembly jig, and a rotating table, etc.

Figure 2:
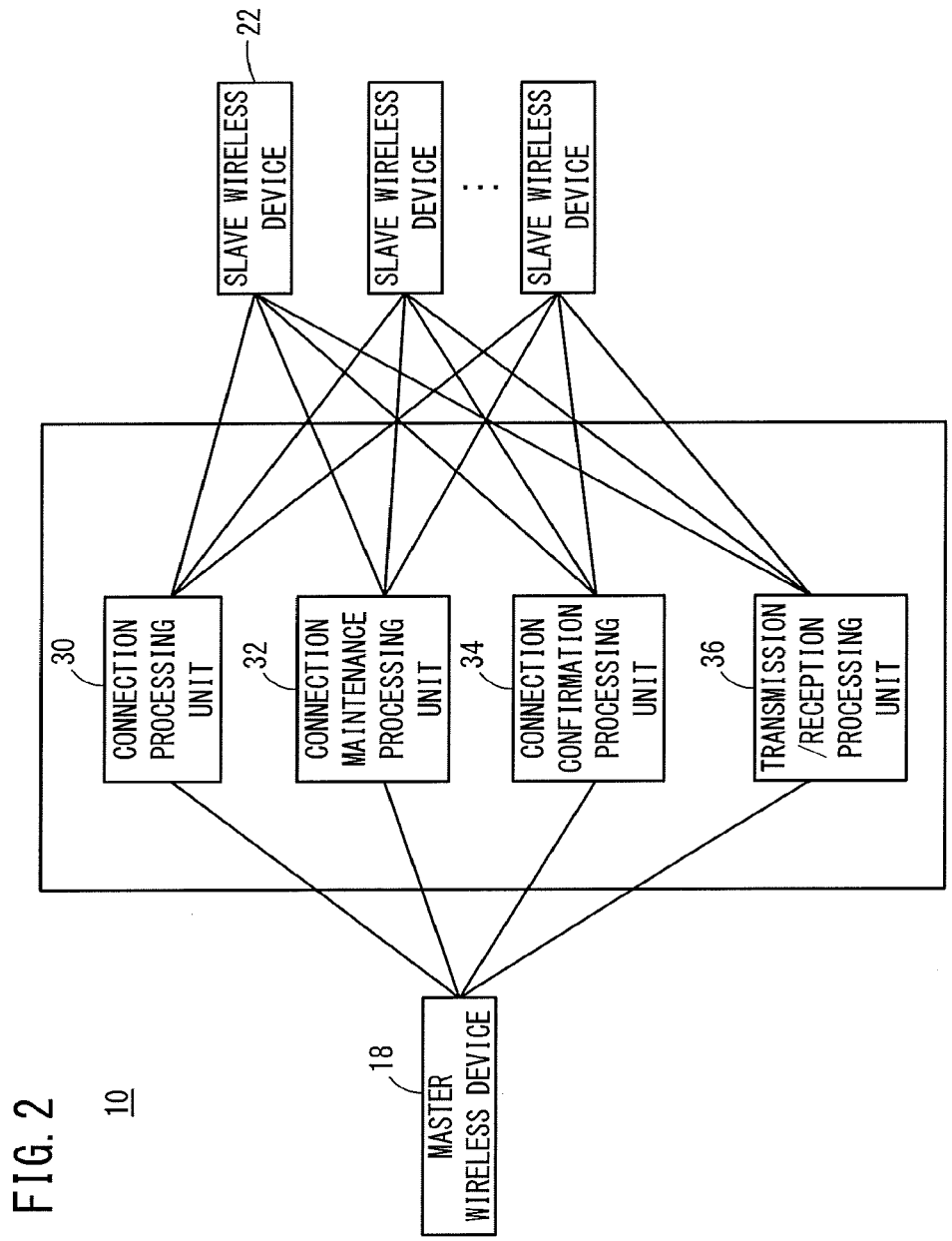
FIG. 2 is a functional block diagram showing the industrial wireless communications system.

Furthermore, as shown in the functional block diagram of FIG. 2, the wireless communications system 10 includes a connection processing unit 30, a connection maintenance processing unit 32, a connection confirmation processing unit 34, and a transmission/reception processing unit 36. Such units, i.e., the connection processing unit 30, the connection maintenance processing unit 32, the connection confirmation processing unit 34, and the transmission/reception processing unit 36, are functional units configured through collaboration between the master wireless device 18 and the plurality of slave wireless devices 22.

The connection processing unit 30 performs a wireless connection process between the master wireless device 18 and the slave wireless devices 22.

Figure 3:
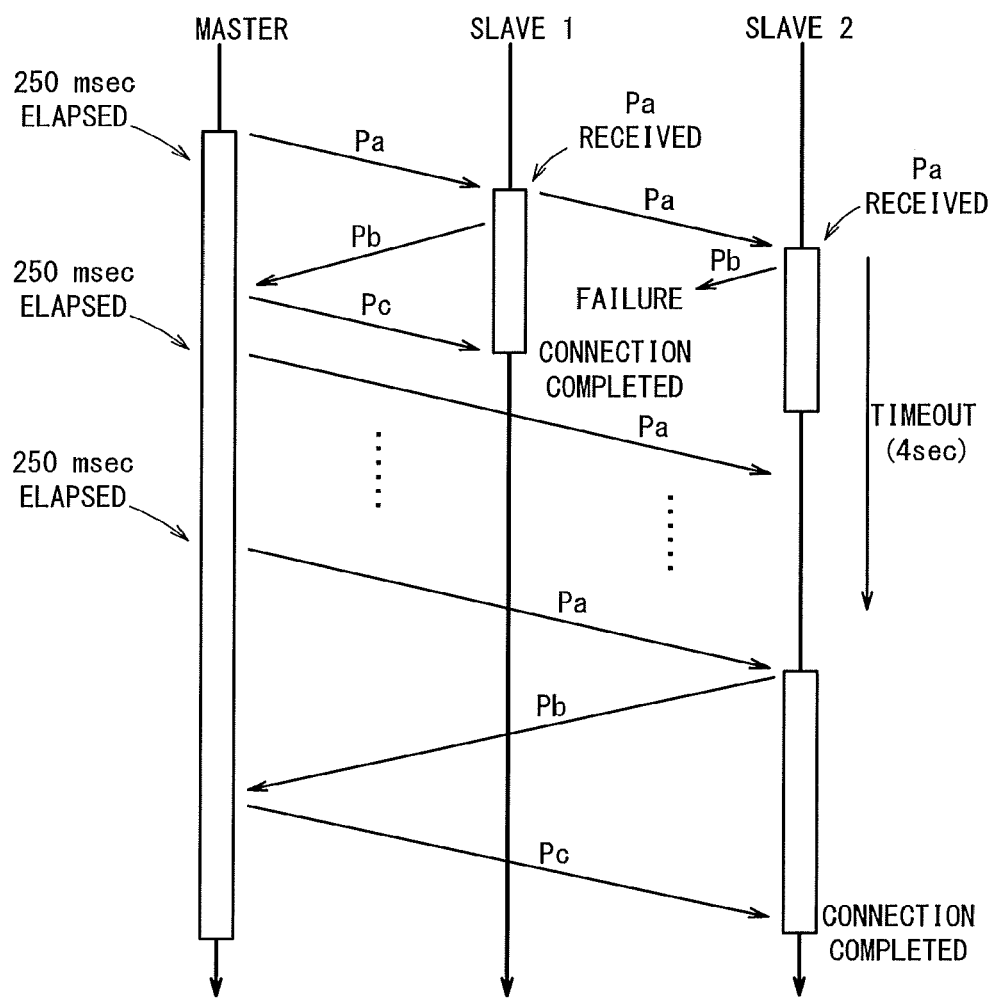
FIG. 3 is an operation conceptual diagram showing an example of a connection process.

More specifically, as shown in FIG. 3, at time intervals of 500 msec or less, and according to the present embodiment, at time intervals of 250 msec, wireless communications from the master wireless device 18 with respect to the plurality of slave wireless devices 22 are carried out over a broadcast system and at synchronous frequencies.

The purpose of such a connection process is for time adjustment between the master wireless device 18 and the slave wireless devices 22, and to carry out exchange of initial values of the master wireless device 18 and initial values of the slave wireless devices 22.

A communications procedure in the case of normal operation, and a communications procedure in the case of abnormal operation will be described below with reference to FIG. 3.

<Normal Operation>

(a-1) The master wireless device 18 transmits synchronization packets Pa in which clock information is included to all of the slave wireless devices 22 under its control, for example, at intervals of 250 msec over a broadcast system. By way of such transmissions, synchronous transmissions are carried out in accordance with a frequency hopping method.

(a-2) The slave wireless devices 22 receive the synchronization packets Pa including the clock information, and calibrate the clock information of the slave wireless devices 22.

(a-3) The slave wireless devices 22 transmit data packets Pb including a connection command and an initial value to the master wireless device 18. By way of such transmissions, transmissions are carried out in accordance with a frequency hopping method from the slave wireless devices 22 to the master wireless device 18.

(a-4) The master wireless device 18 receives the data packets Pb from the slave wireless devices 22, and next, transmits to the slave wireless devices 22 data packets Pc including an initial value of the master wireless device 18 together with the connection command. By way of such transmissions, transmissions are carried out in accordance with a frequency hopping method from the master wireless device 18 to the slave wireless devices 22.

(a-5) The slave wireless devices 22 receive the data packets Pc from the master wireless device 18 and complete the connection. Stated otherwise, establishment of connections with the master wireless device 18 is brought to an end.

<Abnormal Operation>

After receiving the synchronization packets Pa including the clock information, each of the slave wireless devices 22 initiates a timeout measurement. For example, if establishment of connections with the master wireless device 18 is not completed within 4 seconds, another attempt is made again from reception of the clock information.

The frequency hopping method (FHSS) will be briefly described with reference to FIGS. 4A through 6.

Figure 4A:
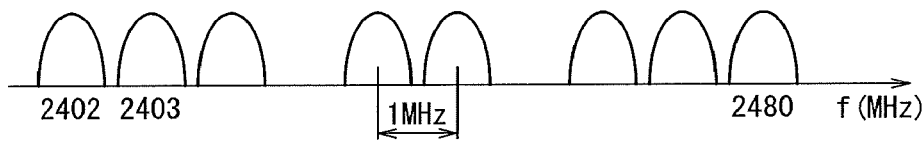
FIG. 4A is an explanatory diagram showing multiplexing of radio frequencies in a 2.4 GHz band.

As shown in FIG. 4A, in the frequency hopping method, communications are performed while changing the multiplexed frequencies synchronously one by one between the transmitter and the receiver.

Figure 4B:
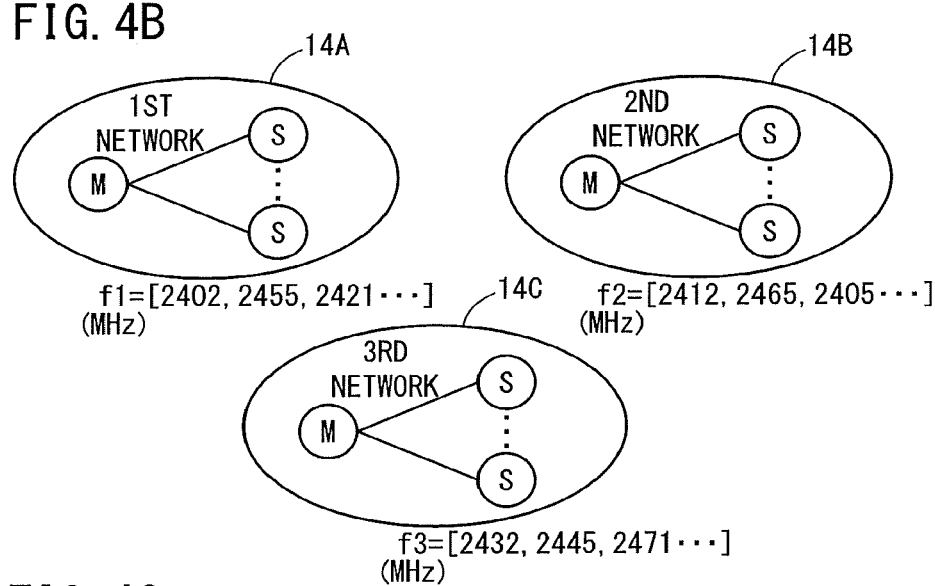
FIG. 4B is an explanatory diagram showing differences in transmission frequencies between networks.
Figure 4C:
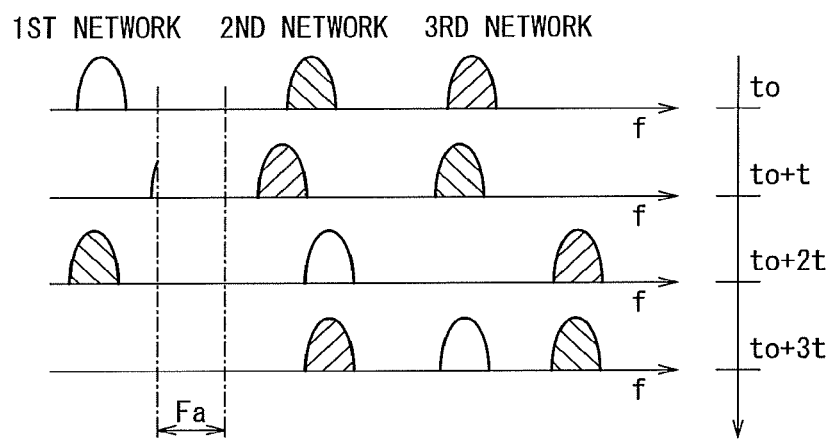
FIG. 4C is a time chart showing an example of frequency hopping.

According to the present embodiment, as shown in FIGS. 4B and 4C, hopping methods having different patterns are adopted for each of the networks. A first network 14A uses as frequencies for the hopping method, for example, 2402 MHz, 2455 MHz, 2421 MHz . . . . A second network 14B uses as frequencies for the hopping method, for example, 2412 MHz, 2465 MHz, 2405 MHz . . . . A third network 14C uses as frequencies for the hopping method, for example, 2432 MHz, 2445 MHz, 2471 MHz . . . .

In addition, as shown in FIG. 4C, communications are carried out by hopping the transmission frequencies in each network at respective transmission times ($t_0$, $t_0+t$, $t_0+2t$, $t_0+3t$, . . . ). Moreover, the interval Fa indicates a bandwidth used by the wireless LAN.

In the foregoing manner, by adopting such a frequency hopping method, together with enabling a reduction in radio wave interference between the networks 14, and the interference with the wireless LAN, it is possible to reduce power attenuation due to multipath fading.

An example will be described below of a calculation method for calculating the synchronous frequencies used by the frequency hopping method.

Initially, the frequency range to be used is converted into channels in units of 1 MHz. For example, assuming that a minimum frequency is 2403 MHz and a maximum frequency is 2481 MHz, 79 channels from 0 ch to 78 ch are made available.

Assuming that wireless communications by way of broadcasts from the master wireless device 18, which, for example, are carried out three times, are considered as one turn, the channel interval of the three radio communications in each of the turns is defined by JAMP, and the channel interval between each one turn is defined by SPACE. Further, a deviation of the channel range to be used (maximum channel−(minimum channel−1)) is defined by CHm, the network number (a consecutive number from 0) is defined by Nn, and the number of radio communications within one turn is defined by Nc (=0, 1, 2).

In addition, synchronous frequency channel numbers SYNC_CH for each of the wireless communications are calculated by the following arithmetic expression. In the expression, the percent symbol % represents a remainder operator.

SYNC_CH=Nn*SPACE+JAMP*Nc%CHm

Figure 5:
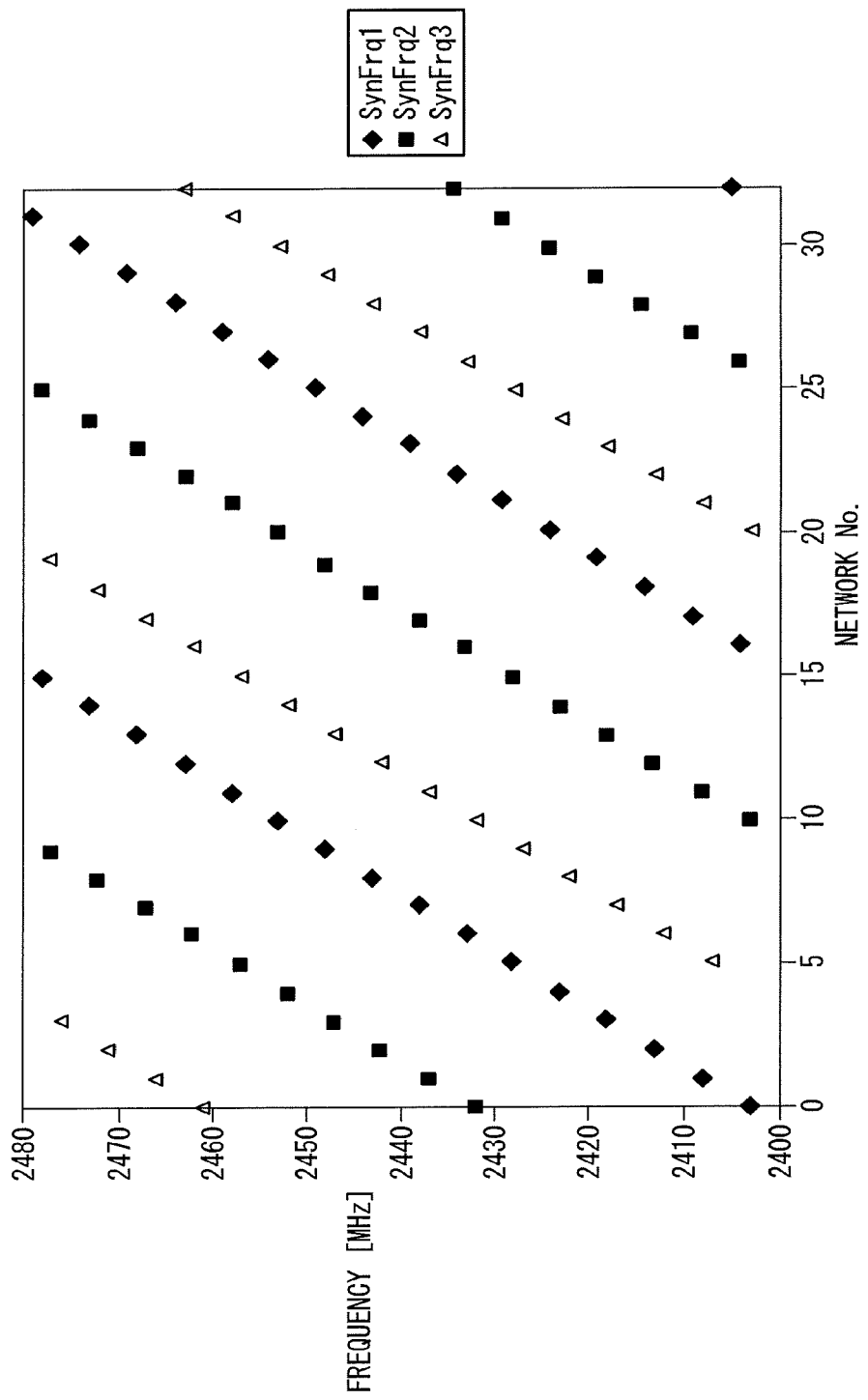
FIG. 5 is a diagram showing an example of synchronous frequency allocations for each network.

Calculation results for the synchronous frequency channel numbers are shown in the following Table 1, and results by which the synchronous frequency channel numbers are converted into synchronous frequencies are shown in the following Table 2. Further, allocation of the synchronous frequencies to network numbers on the basis of Table 2 is shown in FIG. 5.

TABLE 1

| Nm | SYNC_CH1 | SYNC_CH2 | SYNC_CH3 |
|---|---|---|---|
| 0 | 0 | 29 | 58 |
| 1 | 5 | 34 | 63 |
| 2 | 10 | 39 | 68 |
| 3 | 15 | 44 | 73 |
| 4 | 20 | 49 | 78 |
| 5 | 25 | 54 | 4 |
| 6 | 30 | 59 | 9 |
| 7 | 35 | 64 | 14 |
| 8 | 40 | 69 | 19 |

TABLE 2

| Nm | SynFrq1 | SynFrq2 | SynFrq3 |
|---|---|---|---|
| 0 | 2403 | 2432 | 2461 |
| 1 | 2408 | 2437 | 2466 |
| 2 | 2413 | 2442 | 2471 |
| 3 | 2418 | 2447 | 2476 |
| 4 | 2423 | 2452 | 2481 |
| 5 | 2428 | 2457 | 2407 |
| 6 | 2433 | 2462 | 2412 |
| 7 | 2438 | 2467 | 2417 |
| 8 | 2443 | 2472 | 2422 |

As can be understood from Table 1 and Table 2 as well as FIG. 5, since the synchronous frequencies do not overlap between the networks 14, it is possible to simultaneously transmit the synchronous frequencies, which are allocated respectively to each of the networks 14, by way of the broadcast system.

Next, an example will be described of a calculation method for calculating transmission frequencies (referred to as FH transmission frequencies) by the frequency hopping method.

Initially, similar to the calculation method for calculating synchronous frequencies described above, the frequency range to be used is converted into channels in units of 1 MHz. For example, assuming that a minimum frequency is 2403 MHz and a maximum frequency is 2481 MHz, 79 channels from 0 ch to 78 ch are made available.

The frequency hopping interval is indicated by JAMP, the deviation of the channel range to be used (maximum channel−(minimum channel−1)) is indicated by CHm, the network number (a consecutive number from 0) is defined by Nn, and the number of times that frequency hopping is performed is indicated by FHn.

Then, the channel number FH_CH of each FH transmission frequency is calculated using the following arithmetic expression. In the expression, the percent symbol % represents a remainder operator.

FH_CH=Nn+JAMP*FHn%CHm

Figure 6:
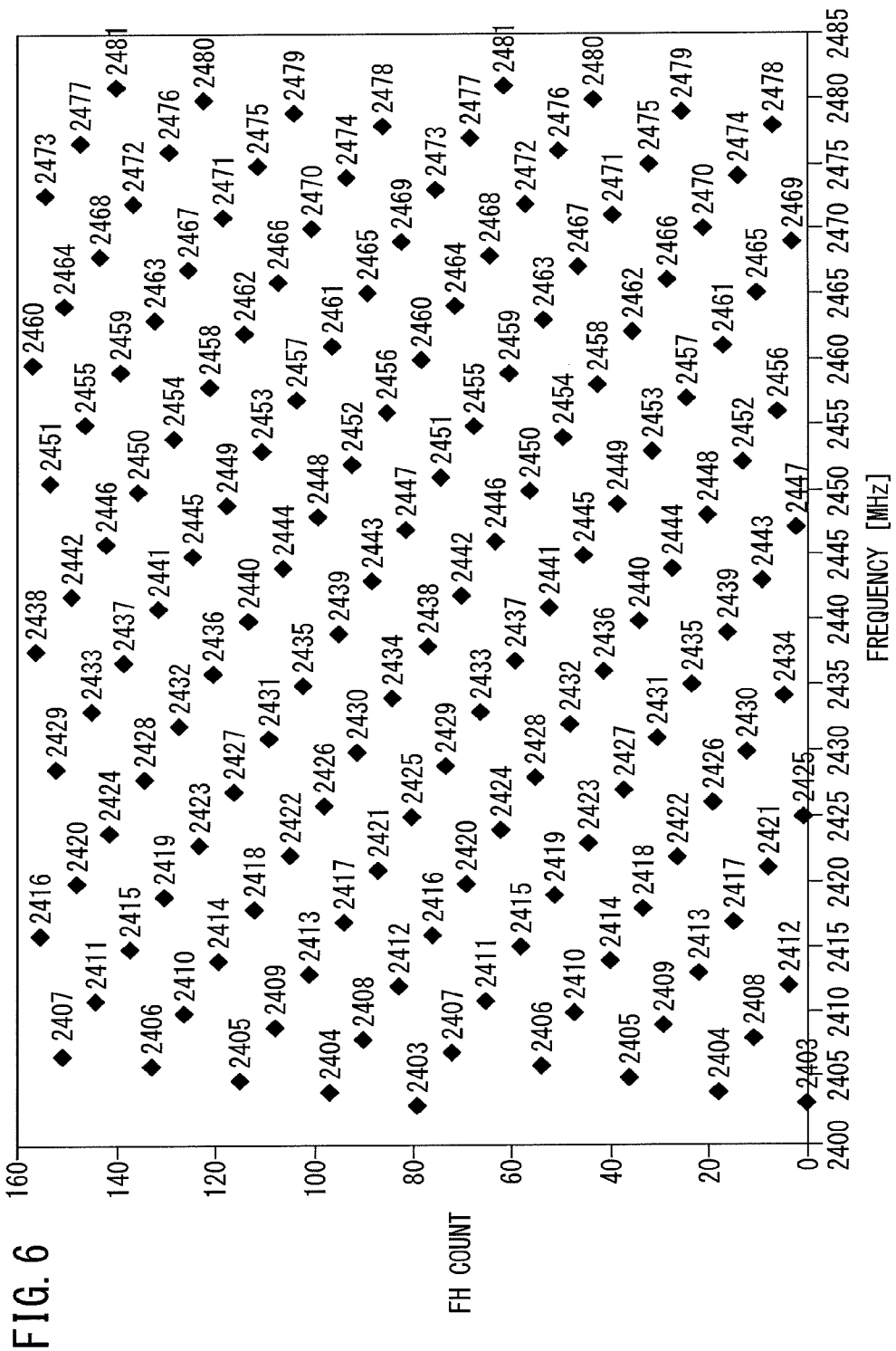
FIG. 6 is a diagram showing a relationship between the number of frequency hops and FH transmission frequencies.

In FIG. 6, a relationship between the number of frequency hops and the FH transmission frequencies is shown. As can be understood from FIG. 6, each time that frequency hopping is performed, due to the fact that the FH transmission frequency is changed at the frequency hopping interval $\Delta f$ (for example 22 MHz), it is possible to prevent interference with other wireless communications.

Furthermore, the slave wireless devices 22 preferably make use of a collision preventing function (CCA) in order to prevent interference between radio waves. In this case, CCA requires a waiting time due to random numbers. According to the present embodiment, since the slave wireless devices 22 have four transmission timings, the transmission timings are determined using a random function based on the slave addresses.

Next, a description will be made concerning the connection maintenance processing unit 32. The connection maintenance processing unit 32 carries out a connection maintenance process with the master wireless device 18, by transmitting clock information of the master wireless device 18 periodically with respect to the slave wireless devices 22 in which the establishment of a connection with the master wireless device 18 has been completed.

More specifically, with respect to a plurality of slave wireless devices 22 for which establishment of connection with the master wireless device 18 has been completed, and at time intervals which are shorter than those of the connection processing unit 30 noted above, and according to the present embodiment, at time intervals, for example, of 100 msec, wireless communications from the master wireless device 18 with respect to the slave wireless devices 22 are carried out over a broadcast system and at synchronous frequencies.

The purpose of this connection maintenance process is to update the clock information of the slave wireless devices 22, by transmitting clock information from the master wireless device 18 to the slave wireless devices 22.

Figure 7:
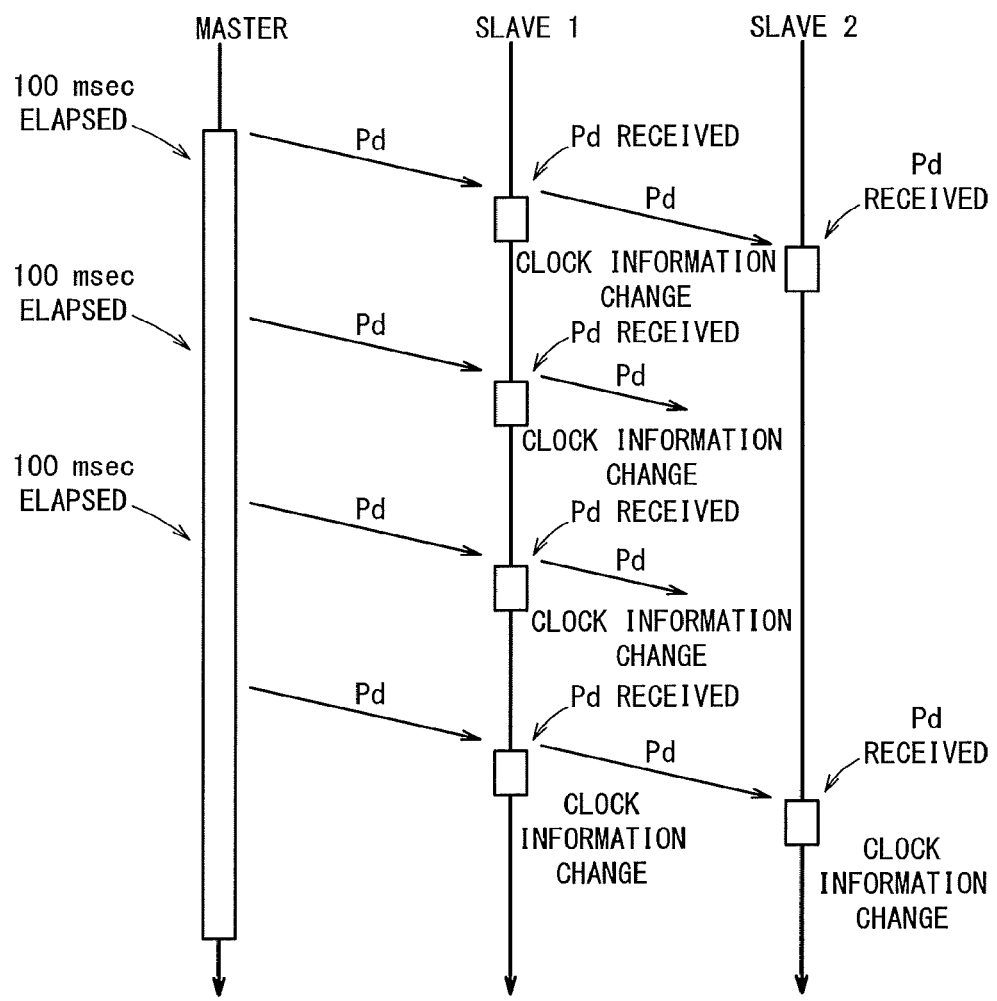
FIG. 7 is an operation conceptual diagram showing an example of a connection maintenance process.

A communications procedure in the case of normal operation and a communications procedure in the case of abnormal operation will be described below with reference to FIG. 7.

<Normal Operation>

(b-1) Synchronization packets Pd in which clock information is included are transmitted over a broadcast system at intervals of 100 msec, for example. By way of such transmissions, synchronous transmissions are carried out in accordance with a frequency hopping method.

(b-2) The slave wireless devices 22 receive the synchronization packets Pd including the clock information, and calibrate the clock information of the slave wireless devices 22.

<Abnormal Operation>

In the case that the slave wireless devices 22 cannot receive the synchronization packets Pd (clock information) from the master wireless device 18, calibration of the clock information is postponed and the slave wireless devices 22 attempt to receive the clock information again after 100 msec.

Next, a description will be made concerning the connection confirmation processing unit 34. The connection confirmation processing unit 34 confirms the establishment of wireless communications between the master wireless device 18 and the slave wireless devices 22, by repeating periodic transmissions from the slave wireless devices 22 and reception by the master wireless device 18.

Figure 8:
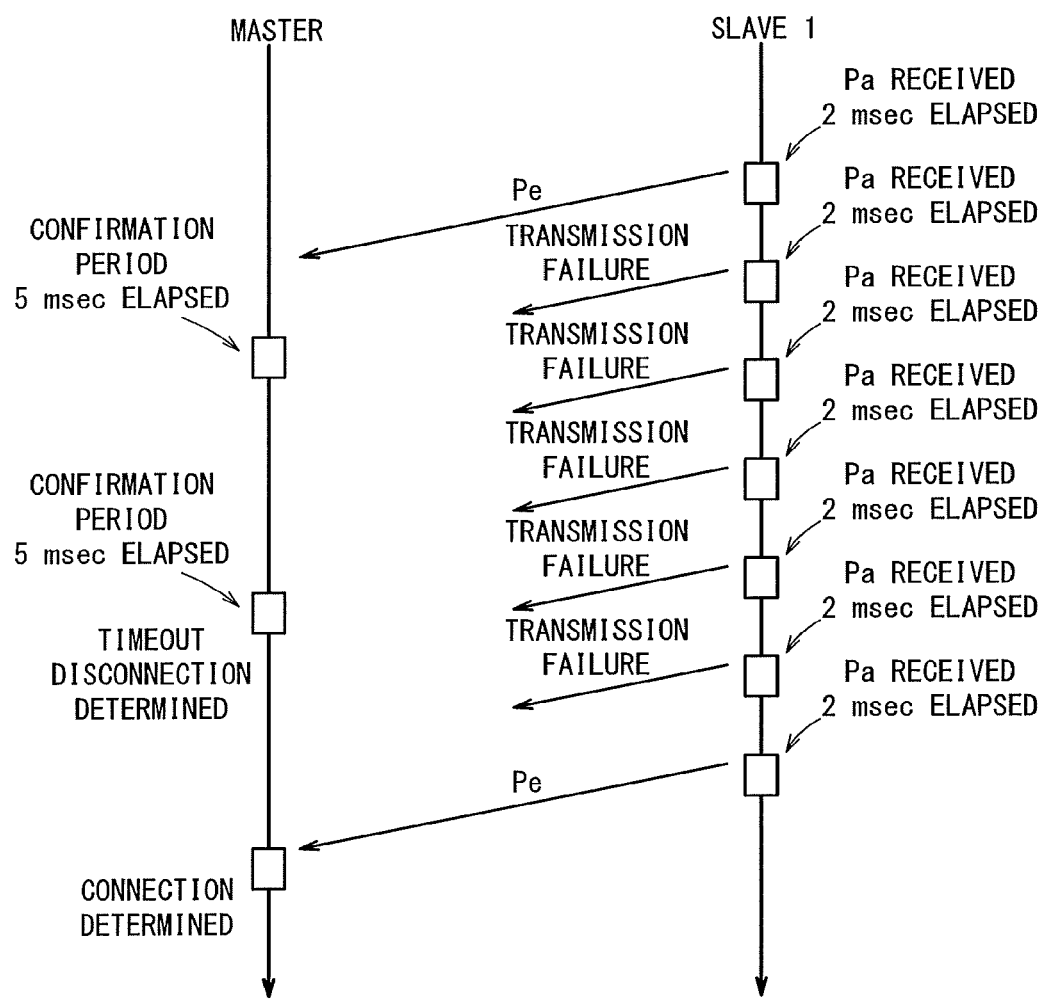
FIG. 8 is an operation conceptual diagram showing an example of a connection confirmation process.

Next, a communications procedure of the connection confirmation processing unit 34 will be described with reference to FIG. 8.

At first, the master wireless device 18 confirms the connections with the slave wireless devices 22, for example, every 5 msec. The slave wireless devices 22 transmit signals, for example, every 2 msec, to the master wireless device 18. One example of the connection confirmation process is indicated below.

<Connection Confirmation>

(c-1) The slave wireless device 22 carries out reception from the master wireless device 18, or transmission of a data packet Pe for confirmation every 2 msec with respect to the master wireless device 18 by a frequency hopping method.

(c-2) The master wireless device 18 confirms the presence or absence of transmission and reception with the slave wireless device 22 every 5 msec, and in the case there is no transmission or reception, determines that the slave wireless device 22 is in a disconnected state.

(c-3) In the master wireless device 18, in the case that a data packet Pe is transmitted from a slave wireless device 22, which was once determined to be in a disconnected state, and the data packet Pe is received by the master wireless device 18, the master wireless device 18 determines that the slave wireless device 22 is in a connected state.

Next, a description will be made concerning the connection transmission/reception processing unit 36.

The transmission/reception processing unit 36 carries out transmission and reception of data between the master wireless device 18 and the slave wireless devices 22.

In greater detail, the transmission/reception processing unit 36 performs wireless communications by a frequency hopping method between the master wireless device 18 and the slave wireless devices 22. More specifically, transmission is performed at FH transmission frequencies with respect to the slave wireless devices 22 from the master wireless device 18, and transmission is performed at FH transmission frequencies with respect to the master wireless device 18 from the slave wireless devices 22.

Below, a description will be made with reference to FIGS. 9 and 10 of a communications procedure involving transmission from the master wireless device 18 to the slave wireless devices 22, and transmission from the slave wireless devices 22 to the master wireless device 18.

<Transmission from Master Wireless Device 18 to Slave Wireless Devices 22>

Figure 9:
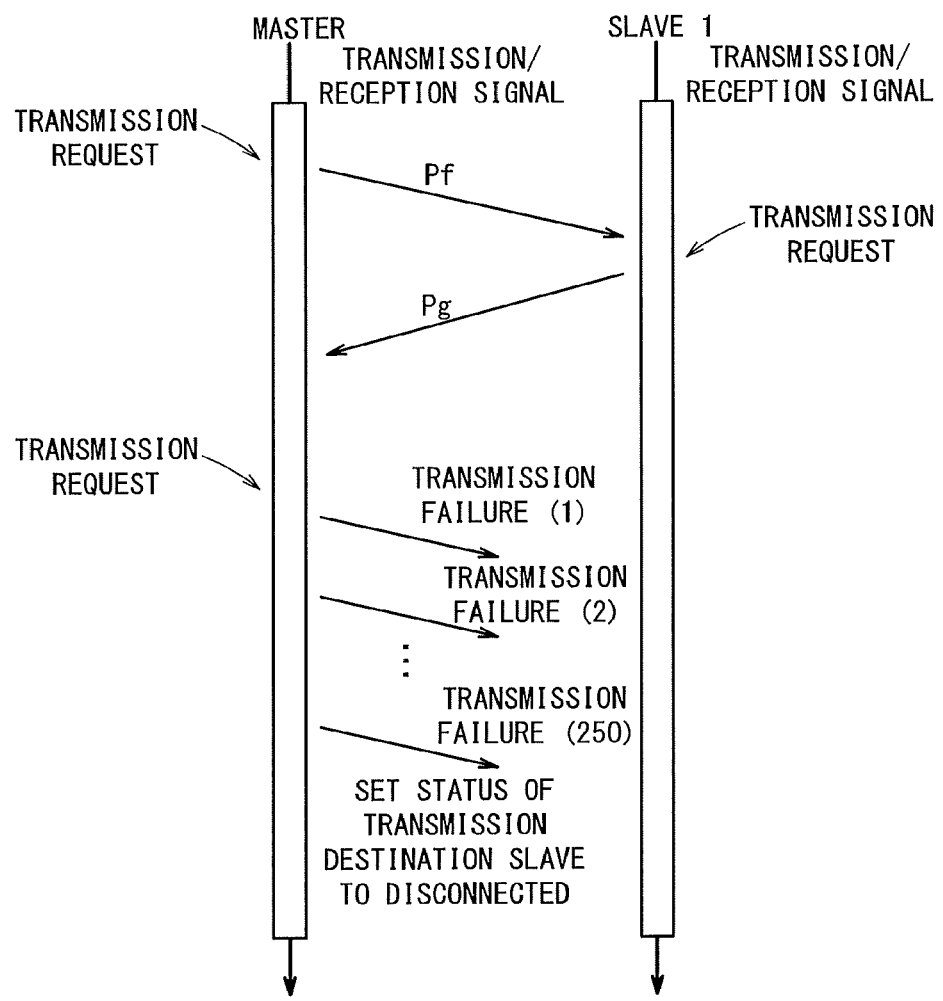
FIG. 9 is an operation conceptual diagram showing a transmission process from a master wireless device to a slave wireless device.

(d-1) As shown in FIG. 9, the master wireless device 18 transmits at the FH transmission frequencies data packets Pf including operation instruction data to a slave wireless device 22 having an address designated by a transmission request.

(d-2) The slave wireless device 22 receives the data packets Pf from the master wireless device 18.

(d-3) In the event that the slave wireless device 22 receives the data packets Pf normally, the slave wireless device 22 determines the received power at levels of three stages.

(d-4) On the basis of the operation instruction data included within the data packets Pf, the slave wireless device 22 instructs the connected hardware device 20 to perform its operation.

(d-5) At a stage at which the hardware device 20 has completed its instructed operation, data packets Pg including at least information indicative of completion of such an operation, and judgment information of the received power are returned to the master wireless device 18 at the FH transmission frequencies.

(d-6) In the case that a data packet Pf is transmitted from the master wireless device 18 multiple times before the reply with a data packet Pg from a slave wireless device 22 to the master wireless device 18 after normal reception of the data packet Pf, the slave wireless device 22 first ignores the data packet Pf a plurality of times, and then returns the data packet Pg only once to the master wireless device 18 at a stage at which the hardware device has completed its intended operation.

(d-7) In the case of a transmission failure, for example, if there is no reply of a data packet Pg from a given slave wireless device 22, the master wireless device 18 reattempts the transmission 250 times at time intervals of 5 msec, for example. If the number of retries exceeds the upper limit (250 times), the master wireless device 18 sets the status of the slave wireless device 22 that was the transmission destination as being disconnected.

<Transmission from Slave Wireless Devices 22 to Master Wireless Device 18>

Figure 10:
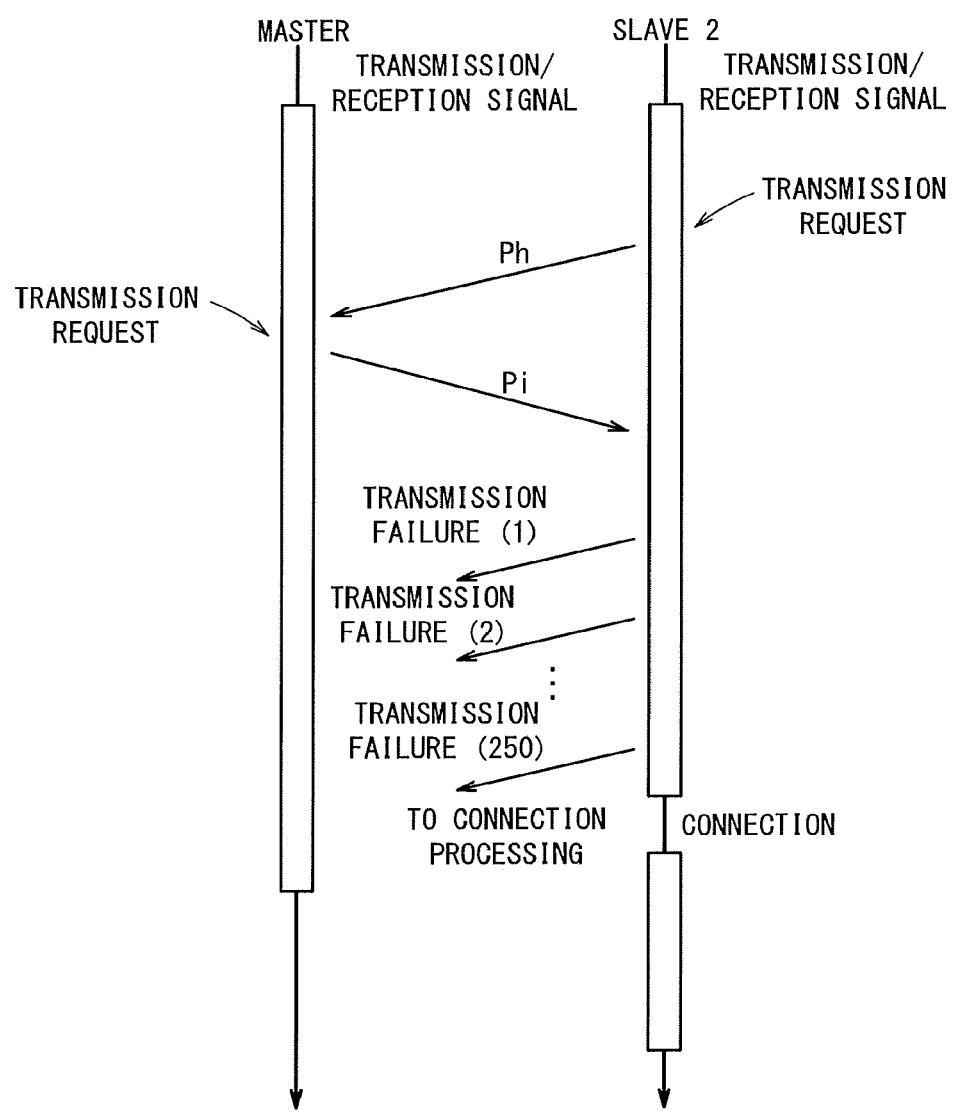
FIG. 10 is an operation conceptual diagram showing a transmission process from a slave wireless device to a master wireless device.

(e-1) As shown in FIG. 10, the slave wireless device 22 transmits at the FH transmission frequencies data packets Ph in which there are included data required by the master wireless device 18 in accordance with transmission requests therefrom, for example, the measurement values of a sensor connected to the slave wireless device 22, the number of retries, etc.

(e-2) The master wireless device 18 receives the data packet Ph from the slave wireless device 22.

(e-3) In the event that the master wireless device 18 receives the data packet Ph normally, the master wireless device 18 determines the received power at levels of three stages.

(e-4) The master wireless device 18 returns to the slave wireless device 22 at the FH transmission frequencies data packet Pi including at least information indicative of normal reception, and judgment information of the received power.

(e-5) In the case that a data packet Ph is transmitted from a slave wireless device 22 multiple times before reply with a data packet Pi from the master wireless device 18 to the slave wireless device 22 after normal reception of the data packet Ph, the master wireless device 18 first ignores the data packet Ph a plurality of times. Then, the master wireless device 18 returns the data packet Pi only once to the slave wireless device 22 at a stage at which the required reception processing by the master wireless device 18 is completed.

(e-6) In the case of a transmission failure, for example, if there is no reply of a data packet Pi from the master wireless device 18, the concerned slave wireless device 22 reattempts the transmission 250 times at time intervals of 5 msec, for example. If the number of retries exceeds the upper limit (250 times), the master wireless device 18 sets the status of the slave wireless device 22 that was the transmission destination as being disconnected, and then transitions to the connection process.

Figure 11:
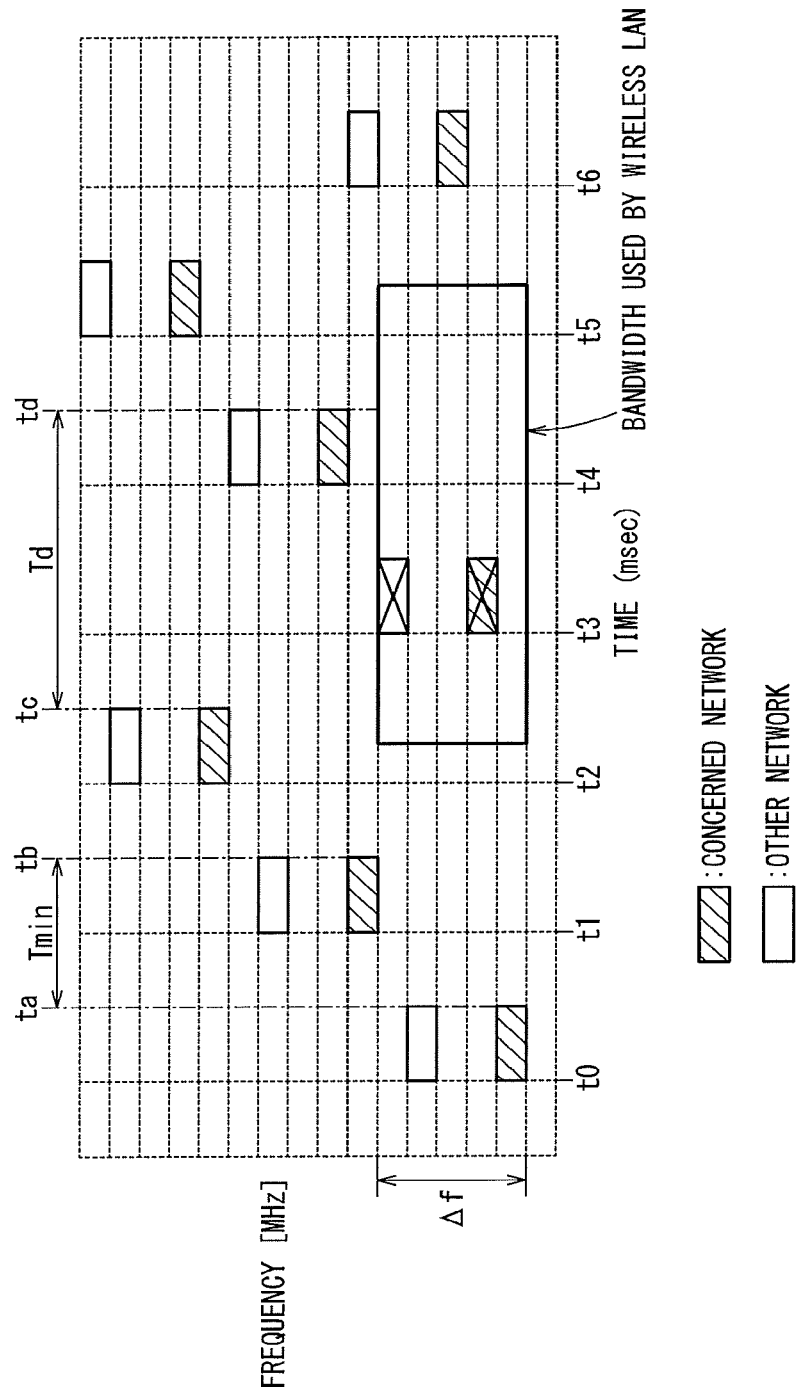
FIG. 11 is a time chart showing changes in transmission frequencies with respect to time, in the case that data packets are sequentially transmitted from the master wireless device to two slave wireless devices.

A description will be made with reference to FIG. 11 concerning a case in which data packets Pf are sequentially transmitted from the master wireless device 18 to two slave wireless devices 22.

Initially, at time t0, the master wireless device 18 transmits data packets Pf at the FH transmission frequencies. The slave wireless devices 22 that are the transmission destinations receive in a normal manner the data packets Pf from the master wireless device 18, and perform their instructed operations with respect to hardware devices connected to the slave wireless devices 22, or alternatively, carry out input/output operations for obtaining sensor values or the like.

At time t1 after 5 msec has elapsed from time t0, the slave wireless devices 22 transmit data packets Pg at the FH transmission frequencies indicating completion of their operations. In this example, since there is not even one retry of transmissions, the wireless transmissions (transmission and reception) are concluded in the fastest manner. More specifically, a fastest response time Tmin is defined by a time period from time ta, in which transmission of the data packets Pf by the master wireless device 18 is completed, to time tb, in which transmission of the data packets Pg by the slave wireless devices 22 is completed. In the other network, wireless communications are performed at different FH transmission frequencies, and therefore, no interference occurs due to the other network.

Next, at time t2, the master wireless device 18 transmits data packets Pf at the FH transmission frequencies. At time t3 after 5 msec has elapsed from time t2, the slave wireless devices 22 transmit data packets Pg at the FH transmission frequencies indicating completion of their operations. At this time, in the event that the FH transmission frequencies lie within a frequency band which is used, for example, by a wireless LAN, and wireless communications are performed by the wireless LAN, then the wireless communications from the slave wireless devices 22 collide with the wireless communications of the wireless LAN, and the transmissions to the master wireless device 18 cannot be completed. Therefore, at time t4 after 5 msec has elapsed from time t3, the master wireless device 18 transmits data packets Pf at the FH transmission frequencies. More specifically, transmission of data packets Pf of the same content is reattempted. At time t5 after 5 msec has elapsed from time t4, the slave wireless devices 22 transmit data packets Pg at the FH transmission frequencies indicating completion of their operations. At this time, in the other network, wireless communications are performed at different FH transmission frequencies, and therefore, no interference occurs due to the other network. Further, in this example, due to the fact that there was one retry, a time period, which takes place from time tc, in which transmission of the data packets Pf of the master wireless device 18 is completed, to time td, in which the first retry of transmission of the data packets Pf is completed, is added as a response delay time period Td.

Moreover, it should be noted that an NFC (Near Field Communication) communications technology is incorporated in the master wireless device 18 and the slave wireless devices 22, etc. As a result, for example, no mechanical settings or adjustments are required in relation to setting of internal parameters in the master wireless device 18 and the slave wireless devices 22, pairing (ID verification, etc.) between the master wireless device 18 and the slave wireless devices 22, and pairing (ID verification, etc.) between the slave wireless devices 22 and the hardware devices 20 (sensors, etc.). Therefore, setting of parameters and pairing, etc., can easily be performed, and it is possible to shorten the time required for adjustment operations and to reduce the number of process steps.

Next, one exemplary embodiment of the wireless communications system 10 will be described with reference to FIGS. 12 and 13.

Figure 12:
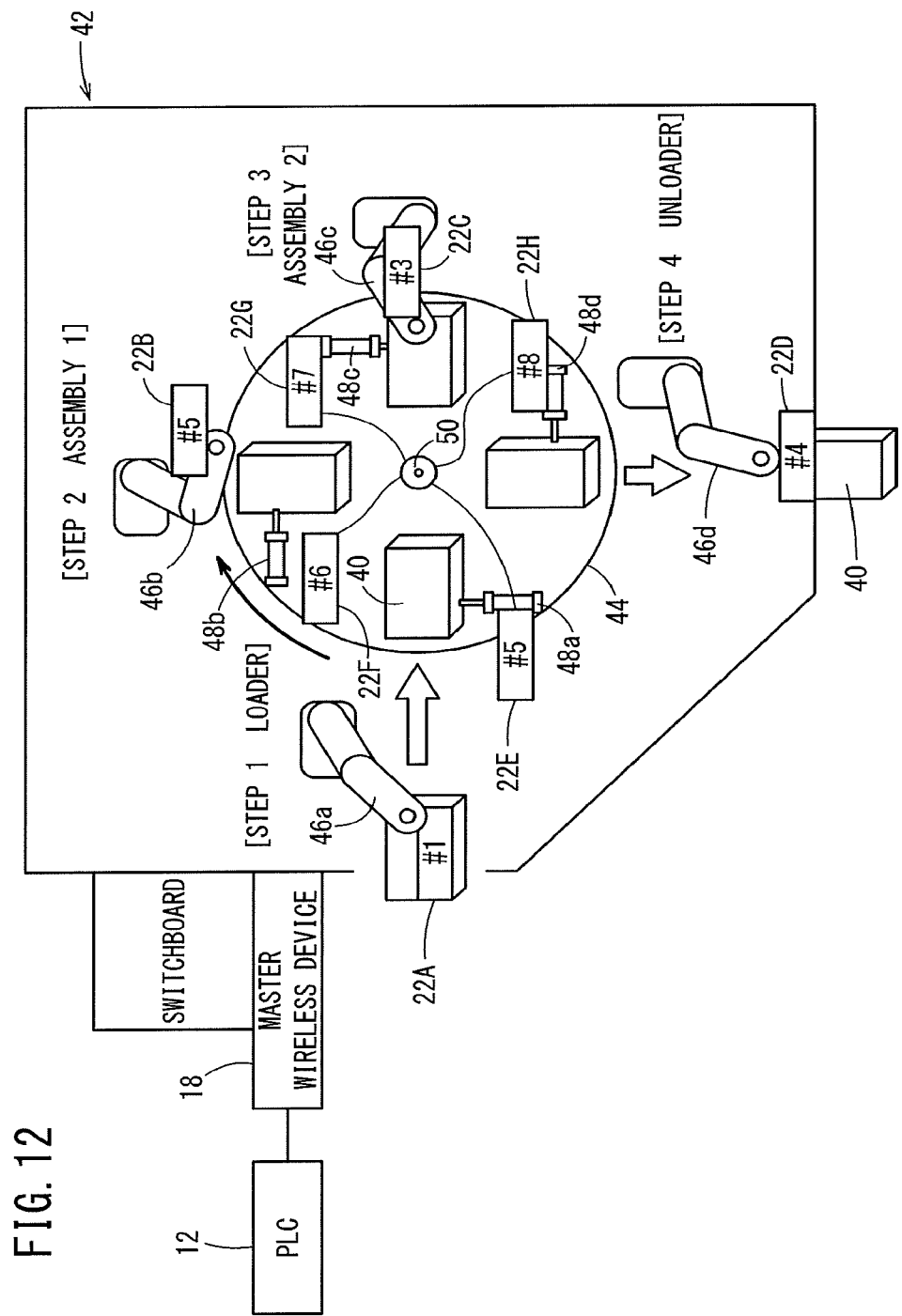
FIG. 12 is a configuration diagram showing one exemplary embodiment of an industrial wireless communications system according to the present embodiment.
Figure 13:
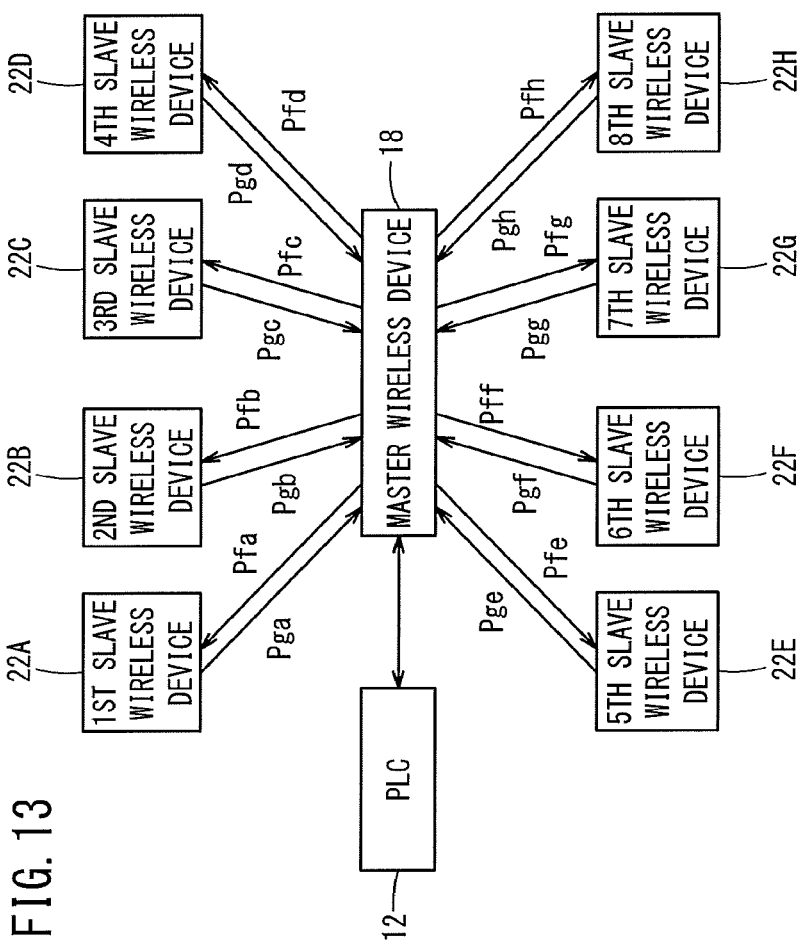
FIG. 13 is an explanatory diagram showing an example of transmission and reception of data packets by a transmission/reception processing unit.

As shown in FIG. 12, the exemplary embodiment is a wireless communications system which is applied to a rotary type production facility 42, in which four steps are carried out from loading to unloading of a workpiece 40. In the rotary type production facility 42, there are provided a rotating table 44, which is installed at the center, and four robot arms or hands 46 (46a to 46d) and four assembly jigs 48 (48a to 48d) corresponding respectively to the first step through the fourth step (steps 1 to 4). Moreover, supply of electrical power from a power source and supply of air are carried out to the respective robot hands 46 and the assembly jigs 48 through a supply unit 50 which is set at the center of the rotating table 44.

Prior to assembling the rotary type production facility 42, respective slave wireless devices 22 are installed, respectively, corresponding to each of the robot hands 46 and the assembly jigs 48. In the example shown in FIG. 12, a first slave wireless device 22A is installed in the first robot hand 46a that corresponds to a loader step (step 1), and a fifth slave wireless device 22E is installed in the first assembly jig 48a. A second slave wireless device 22B is installed in the second robot hand 46b that corresponds to a first assembly step (step 2), and a sixth slave wireless device 22F is installed in the second assembly jig 48b. A third slave wireless device 22C is installed in the third robot hand 46c that corresponds to a second assembly step (step 3), and a seventh slave wireless device 22G is installed in the third assembly jig 48c. A fourth slave wireless device 22D is installed in the fourth robot hand 46d that corresponds to an unloader step (step 4), and an eighth slave wireless device 22H is installed in the fourth assembly jig 48d.

Further, prior to assembling the rotary type production facility 42, tag information corresponding to a product, and a number of mapped I/O points are set in each of the respective slave wireless devices 22.

The master wireless device 18 has registered therein in advance the numbers of the first slave wireless device 22A to the eighth slave wireless device 22H, which are used in the rotary type production facility 42, and enables the slave wireless devices 22 to be rearranged or combined in a different manner as may be necessary during maintenance thereof. The setting content can be stored in a file as necessary, and if the slave wireless devices 22 have been rearranged, the setting content therefor can be restored from the saved file.

The storable setting content includes tag information, the number of I/O points, as well as other setting parameters.

Further, the master wireless device 18, which is installed at a location outside of the rotary type production facility 42, receives signals from the PLC 12, which is incorporated in a switchboard, for example, and transmits at the FH transmission frequencies signals to the slave wireless devices 22 that are installed in the rotary type production facility 42.

Next, a description will be made with reference to FIG. 13 concerning step 1 through step 4.

<Step 1: Loader Step>

On the basis of an input of an insertion start signal from the PLC 12, the master wireless device 18 transmits a data packet Pfa indicating the insertion of a workpiece 40 to the first slave wireless device 22A. On the basis of the data packet Pfa, the first slave wireless device 22A issues an instruction to the first robot hand 46a to grip the workpiece 40. On the basis of the instruction from the first slave wireless device 22A, the first robot hand 46a grips the workpiece 40 and conveys the workpiece 40 inwardly onto the rotating table 44. At a stage at which conveyance of the workpiece 40 by the first robot hand 46a is completed, the first slave wireless device 22A transmits to the master wireless device 18 a data packet Pga indicating that conveyance of the workpiece 40 has been completed.

Based on reception of the data packet Pga from the first slave wireless device 22A, the master wireless device 18 transmits a data packet Pfe indicative of a positioning instruction to the fifth slave wireless device 22E. On the basis of reception of the data packet Pfe, the fifth slave wireless device 22E issues an insertion time positioning instruction to the first assembly jig 48a. The first assembly jig 48a performs positioning of the workpiece 40 on the basis of the instruction from the fifth slave wireless device 22E. At a stage at which positioning of the workpiece 40 by the first assembly jig 48a is completed, the fifth slave wireless device 22E transmits to the master wireless device 18 a data packet Pge indicating that positioning of the workpiece 40 has been completed. The master wireless device 18 outputs an insertion completion signal to the PLC 12 based on reception of the data packet Pge from the fifth slave wireless device 22E.

<Step 2: First Assembly Step>

On the basis of an input of a first assembly signal from the PLC 12, the master wireless device 18 transmits a data packet Pfb to the second slave wireless device 22B indicating the supply of a first part. On the basis of reception of the data packet Pfb, the second slave wireless device 22B issues an instruction to the second robot hand 46b to supply the part. On the basis of the instruction from the second slave wireless device 22B, the second robot hand 46b supplies the part to the second assembly jig 48b. At a stage at which supply of the part by the second robot hand 46b is completed, the second slave wireless device 22B transmits to the master wireless device 18 a data packet Pgb indicating that supply of the first part has been completed.

Based on reception of the data packet Pgb from the second slave wireless device 22B, the master wireless device 18 transmits a data packet Pff indicative of an assembly instruction to the sixth slave wireless device 22F. On the basis of reception of the data packet Pff, the sixth slave wireless device 22F issues an assembly instruction to the second assembly jig 48b. The second assembly jig 48b performs a first assembly operation with respect to the workpiece 40 on the basis of the instruction from the sixth slave wireless device 22F. At a stage at which the first assembly operation for the workpiece 40 by the second assembly jig 48b is completed, the sixth slave wireless device 22F transmits to the master wireless device 18 a data packet Pgf indicating that the first assembly operation has been completed. The master wireless device 18 outputs a first assembly completion signal to the PLC 12 based on reception of the data packet Pgf from the sixth slave wireless device 22F.

<Step 3: Second Assembly Step>

On the basis of an input of a second assembly signal from the PLC 12, the master wireless device 18 transmits a data packet Pfc to the third slave wireless device 22C indicating the supply of a second part. On the basis of reception of the data packet Pfc, the third slave wireless device 22C issues an instruction to the third robot hand 46c to supply the part. On the basis of the instruction from the third slave wireless device 22C, the third robot hand 46c supplies the part to the third assembly jig 48c. At a stage at which supply of the part by the third robot hand 46c is completed, the third slave wireless device 22C transmits to the master wireless device 18 a data packet Pgc indicating that supply of the second part has been completed.

Based on reception of the data packet Pgc from the third slave wireless device 22C, the master wireless device 18 transmits a data packet Pfg indicative of an assembly instruction to the seventh slave wireless device 22G. On the basis of reception of the data packet Pfg, the seventh slave wireless device 22G issues an assembly instruction to the third assembly jig 48c. The third assembly jig 48c performs a second assembly operation with respect to the workpiece 40, on the basis of the instruction from the seventh slave wireless device 22G. At a stage at which the second assembly operation for the workpiece 40 by the third assembly jig 48c is completed, the seventh slave wireless device 22G transmits to the master wireless device 18 a data packet Pgg indicating that the second assembly operation has been completed. The master wireless device 18 outputs a second assembly completion signal to the PLC 12 based on reception of the data packet Pgg from the seventh slave wireless device 22G.

<Step 4: Unloader Step>

On the basis of an input of a convey-out start signal from the PLC 12, the master wireless device 18 transmits a data packet Pfh indicative of a positioning instruction to the eighth slave wireless device 22H. On the basis of reception of the data packet Pfh, the eighth slave wireless device 22H issues a convey-out time positioning instruction to the fourth assembly jig 48d. The fourth assembly jig 48d performs positioning of the workpiece 40 on the basis of the instruction from the eighth slave wireless device 22H. At a stage at which positioning of the workpiece 40 by the fourth assembly jig 48d is completed, the eighth slave wireless device 22H transmits to the master wireless device 18 a data packet Pgh indicating that positioning of the workpiece 40 has been completed. Based on reception of the data packet Pgh from the eighth slave wireless device 22H, the master wireless device 18 transmits a data packet Pfd to instruct the fourth slave wireless device 22D to convey the workpiece 40 out. On the basis of reception of the data packet Pfd, the fourth slave wireless device 22D issues an instruction to the fourth robot hand 46d to grip the workpiece 40. On the basis of the instruction from the fourth slave wireless device 22D, the fourth robot hand 46d grips the workpiece 40, and conveys the workpiece 40 outwardly from the rotating table 44. At a stage at which outward conveyance of the workpiece 40 by the fourth robot hand 46d is completed, the fourth slave wireless device 22D transmits to the master wireless device 18 a data packet Pgd indicating that outward conveyance (unloading) of the workpiece 40 has been completed. The master wireless device 18 outputs a convey-out completion signal to the PLC 12 based on reception of the data packet Pgd from the fourth slave wireless device 22D.

By output of the convey-out completion signal from the master wireless device 18, outward conveyance of the workpiece 40 is completed, and the sequence of assembly steps is brought to an end.

Since data packets are exchanged between the master wireless device 18 and the slave wireless devices 22 according to the order in which the various instruction signals are generated from the PLC 12, necessary operations can be effected from the slave wireless device 22 from which the data packet is necessary as a response. More specifically, there is no need to perform communications with unnecessary slave wireless devices 22, and therefore, the response speed can be improved.

In the present embodiment, the data capacity of the data packets to be transmitted is small, i.e., is less than or equal to 50 bytes, despite the fact that the number of channels is 79, in the same manner as a Bluetooth (registered trademark) frequency hopping method. Therefore, the transmission power can be suppressed to be less than or equal to 1 mW.

In the foregoing manner, in the industrial wireless communications system 10 according to the present embodiment, there are included the PLC 12 that performs at least monitoring within an industrial facility, at least one master wireless device 18 connected to the PLC 12 by the fieldbus 16, and a plurality of slave wireless devices 22, which are installed corresponding to the respective hardware devices 20, and carry out wireless communications with the master wireless device 18. Furthermore, the wireless communications system 10 includes the connection processing unit 30, which carries out a connection process wirelessly between the master wireless device 18 and the slave wireless devices 22, and the transmission/reception processing unit 36, which transmits and receives data wirelessly between the master wireless device 18 and the slave wireless devices 22.

More specifically, connection processing and transmission and reception of signals are carried out wirelessly between the master wireless device 18, which is connected to the PLC 12, and the slave wireless devices 22, which are installed in the various hardware devices 20 (such as robots, welding guns, rotating jigs, motors, etc.). As a result, the risk of disconnection of the signal lines and the like in movable components of the hardware devices 20 can be reduced, and it is possible to improve the freedom of design in industrial facilities. This leads to the promotion of intelligent systems in such industrial facilities.

In addition, at time intervals of 500 msec or less, the connection processing unit 30 carries out wireless communications from the master wireless device 18 with respect to the plurality of slave wireless devices 22 over a broadcast system and at synchronous frequencies. The transmission/reception processing unit 36 performs wireless communications by a frequency hopping method between the master wireless device 18 and the slave wireless devices 22.

More specifically, the connection processing unit 30 performs transmission at frequencies (synchronous frequencies), which are set according to the frequency hopping method, with respect to the slave wireless devices 22 from the master wireless device 18, and performs transmission at the FH transmission frequencies with respect to the master wireless device 18 from the slave wireless devices 22. On the other hand, the transmission/reception processing unit 36 performs transmission at FH transmission frequencies, which are set according to the frequency hopping method, with respect to the slave wireless devices 22 from the master wireless device 18, and performs transmission at FH transmission frequencies, which are newly set by the frequency hopping method, with respect to the master wireless device 18 from the slave wireless devices 22.

In this manner, from the fact that the wireless connection process is carried out over the broadcast system and at time intervals of 500 msec or less, for example, at the time of attaching or detaching an assembly jig, it is possible to shorten the time from turning on the power source to the start of communications therewith. Further, from the fact that wireless communications are performed by a frequency hopping method between the master wireless device 18 and the slave wireless devices 22, it is possible to prevent interference with other wireless communications.

Further, according to the present embodiment, a 2.4 GHz band is used as a wireless frequency, and the wireless power is set to be less than or equal to 1 mW. Since a wireless frequency is adopted which is higher than the frequency of noise generated from a noise source (such as power supply lines, a robot, a welding gun, a rotating jig, a motor, etc.) of industrial equipment in a factory or the like, it is possible to reduce the influence on wireless communications by the noise frequency. Further, because the wireless power is suppressed to be less than or equal to 1 mW, it is possible to reduce interference with other communications equipment that exists within the same area.

Furthermore, according to the present embodiment, there is included the connection maintenance processing unit 32, which is configured to carry out a connection maintenance process with the master wireless device 18, by transmitting clock information of the master wireless device 18 periodically with respect to the slave wireless devices 22 in which the connection process has been carried out.

Since clock information from the master wireless device 18 is transmitted periodically to the slave wireless devices 22 for which the connection process has been completed, the clock information coincides between the slave wireless devices 22 and the master wireless device 18. As a result, the timing of data transmission and reception can easily be synchronized.

Further, in the present embodiment, there is included the connection confirmation processing unit 34 which is configured to confirm establishment of wireless communications between the master wireless device 18 and the plurality of slave wireless devices 22, by repeating periodic transmissions from the slave wireless devices 22 and reception by the master wireless device 18.

Although transmissions should be periodically transmitted from the slave wireless devices 22, in the case that such transmissions are not received by the master wireless device 18, it is determined that a slave wireless device 22 is in a disconnected state. If transmissions from a slave wireless device 22 which has been determined to be in a disconnected state are later received by the master wireless device 18, a determination is made that the slave wireless device 22 is in a connected state. Owing to this feature, it is possible to easily determine which ones of the slave wireless devices 22 are in a connected state, and which ones of the slave wireless devices 22 are in a disconnected state. Thus, connection processing or maintenance, etc., with respect to slave wireless devices 22 that are determined to be in a disconnected state can be carried out at an early stage.

The industrial wireless communication system according to the present invention is not limited to the above embodiment, and it is a matter of course that various additional or modified structures could be adopted therein without departing from the scope and essence of the invention as set forth in the appended claims.

What is claimed is:

1. An industrial wireless communications system, comprising:
    a computer configured to perform at least monitoring within an industrial facility;
    at least one master wireless device connected to the computer by a fieldbus;
    a plurality of slave wireless devices, which are installed corresponding to respective hardware devices, and are configured to carry out wireless communications with the master wireless device;
    a connection processing unit configured to carry out a connection process wirelessly between the master wireless device and the slave wireless devices; and
    a transmission/reception processing unit configured to transmit and receive data wirelessly between the master wireless device and the slave wireless devices.

2. The industrial wireless communications system according to claim 1, wherein:
    the connection processing unit is configured to carry out wireless communications at time intervals of 500 msec or less from the master wireless device to the plurality of slave wireless devices over a broadcast system and at synchronous frequencies; and
    the transmission/reception processing unit is configured to carry out wireless communications by a frequency hopping method between the master wireless device and the slave wireless devices.

3. The industrial wireless communications system according to claim 1, wherein a 2.4 GHz band is used as a wireless frequency, and a wireless power is less than or equal to 1 mW.

4. The industrial wireless communications system according to claim 1, further comprising a connection maintenance processing unit configured to carry out a connection maintenance process with the master wireless device, by transmitting clock information of the master wireless device periodically with respect to the slave wireless devices in which the connection process has been carried out.

5. The industrial wireless communications system according to claim 1, further comprising a connection confirmation processing unit configured to confirm establishment of wireless communications between the master wireless device and the plurality of slave wireless devices, by repeating periodic transmissions from the slave wireless devices and reception by the master wireless device.

* * * * *